United States Patent
Lewis et al.

(10) Patent No.: US 10,965,163 B2
(45) Date of Patent: Mar. 30, 2021

(54) COMPACT POWER TRANSFER MECHANISM USING INDUCED EMF

(71) Applicant: Hanchett Entry Systems, Inc., Phoenix, AZ (US)

(72) Inventors: Robert W. Lewis, Tempe, AZ (US); Leland J. Hanchett, Jr., Falmouth, ME (US)

(73) Assignee: Hanchett Entry Systems, Inc., Phoenix, AZ (US)

(*) Notice: Subject to any disclaimer, the term of this patent is extended or adjusted under 35 U.S.C. 154(b) by 0 days.

(21) Appl. No.: 16/775,667

(22) Filed: Jan. 29, 2020

(65) Prior Publication Data

US 2020/0169119 A1 May 28, 2020

Related U.S. Application Data

(62) Division of application No. 15/093,377, filed on Apr. 7, 2016, now Pat. No. 10,840,740.

(60) Provisional application No. 62/147,397, filed on Apr. 14, 2015.

(51) Int. Cl.
*H02J 50/12* (2016.01)
*H02J 7/02* (2016.01)
*B60L 53/12* (2019.01)
*E05B 47/00* (2006.01)

(52) U.S. Cl.
CPC .............. *H02J 50/12* (2016.02); *B60L 53/12* (2019.02); *H02J 7/025* (2013.01); *E05B 2047/0061* (2013.01); *E05B 2047/0082* (2013.01)

(58) Field of Classification Search
CPC ......... H02J 50/12; H02J 7/025; B60L 11/182; E05B 2047/0061; E05B 2047/0082
USPC ....................................................... 307/104
See application file for complete search history.

(56) References Cited

U.S. PATENT DOCUMENTS

| | | | |
|---|---|---|---|
| 6,011,320 A | 1/2000 | Miyamoto et al. | |
| 8,294,302 B2 | 10/2012 | Peabody et al. | |
| 8,461,802 B2 | 6/2013 | Tsai | |
| 8,946,936 B2 | 2/2015 | Okada | |
| 9,290,966 B2 | 3/2016 | Hanchett, Jr. | |
| 2002/0117896 A1 | 8/2002 | Gohara | |
| 2007/0033415 A1 | 2/2007 | Yumoto | |
| 2009/0308116 A1* | 12/2009 | Lambrou | E05B 47/02 70/277 |
| 2010/0308664 A1 | 12/2010 | Face | |

(Continued)

*Primary Examiner* — Rexford N Barnie
*Assistant Examiner* — Swarna N Chowdhuri
(74) *Attorney, Agent, or Firm* — Woods Oviatt Gilman LLP; Ronald J. Kisicki, Esq.; Dennis B. Danella, Esq.

(57) ABSTRACT

What is presented is a power-transfer system that provides resonant inductive power from a first object to a second object, which is adjacent to the first object. The system includes a first transformer portion that is positioned on the first object and having a first core portion. The first core portion includes a transmit unit configured to transfer an electromagnetic field to the second transformer portion. The first core portion also includes first circuitry that allows the transmit unit to transfer the electromagnetic field. The second transformer portion is positioned on the second object and has a second core portion. The second core portion includes a receiver unit configured to receive the electromagnetic field. The second core portion also includes second circuitry that allows the transmit unit to transfer the electromagnetic field.

9 Claims, 4 Drawing Sheets

(56) References Cited

U.S. PATENT DOCUMENTS

| | | | |
|---|---|---|---|
| 2012/0267962 A1* | 10/2012 | Hanchett, Jr. | H02J 50/80 |
| | | | 307/104 |
| 2013/0334892 A1* | 12/2013 | Hall | H02J 50/50 |
| | | | 307/104 |
| 2014/0020295 A1* | 1/2014 | Bonahoom | G01B 7/14 |
| | | | 49/25 |
| 2014/0028110 A1* | 1/2014 | Petersen | H02J 50/12 |
| | | | 307/104 |
| 2015/0002112 A1* | 1/2015 | Tang | H02H 7/1213 |
| | | | 323/271 |
| 2016/0322847 A1* | 11/2016 | Geiszler | H04B 5/0093 |

* cited by examiner

COMPACT POWER TRANSFER MECHANISM USING INDUCED EMF

CROSS-REFERENCE TO RELATED APPLICATIONS

This application is a divisional of U.S. patent application Ser. No. 15/093,377, filed Apr. 7, 2016, which claims the benefit of U.S. Patent Application No. 62/147,397, filed Apr. 14, 2015, the contents of which are hereby incorporated by reference in their entirety.

TECHNICAL FIELD

The present invention relates to power-transfer devices and systems for providing a resonant inductive power coupling between a first object and a second object; more particularly, to such a device or system wherein said first and second objects are not physically connected electrically; and most particularly, to providing electric power to a lock mechanism for electrically locking or unlocking a door mounted in a frame via a transformer arrangement having a transmitter portion and a receiver portion. The transformer arrangement may reside in a mortise-type lock set having a latch electrically retained or released from its related strike or the transformer arrangement may reside in the edge of the door and adjacent surface of the door frame separate from a lock set.

BACKGROUND OF THE INVENTION

The need to transfer power through air or other non-magnetic/non-conducting materials is becoming vital throughout today's world. One way to accomplish this need is through the implementation of inductive or resonant inductive power coupling devices. Such devices can be used to recharge the batteries of electronic devices and electric automobile batteries as well as coupling stationary equipment to rotating armatures or powering hypo-dermal medical devices. Particularly, in the access control field, there has been a long-felt need to power electrified locking mechanisms, residing in a door, by a method that does not require running any type of wiring through the environment in which the locking mechanism is installed (e.g. running wires through the hinges connecting a door to a corresponding door frame) as well as does not require cross drilling through the door or using spring loaded power contacts, which become exposed when the door is in the open position. Resonant inductive coupling having one portion mounted in the door and a corresponding mating portion mounted in the door frame provides a viable solution to the industry's long-felt need but also poses challenges for those with skill in the art, such as ensuring the electromagnetic field properly transfers across the distance of the gap between the door and its corresponding door frame (or, in certain instances, a mullion), regardless of the gap's unique characteristics, and the need for the installed components to occupy a minimal amount of space such as no more than a one inch diameter space in the door and a one inch diameter space in the door frame. Another challenge posed to the skilled artisan, particularly when using solenoid actuators, is that no less than six watts of power must be transferred from the door frame to the door for a duration of time that is long enough to move the actuator (load), which in turn ultimately releases the locking mechanism.

Prior art systems transfer power and/or data between a door and a door frame with wires that run through a mechanical hinge point or a set of spring loaded contacts that provide an electrical connection across the distance of the gap between the door and corresponding door frame, when the door is in the closed position. The problem with this wire-based approach is that only fine wires with very small diameters can be used, since such wires must pass internally through the plates of the door hinges to avoid being severed during normal operation or by an unwanted intruder. The spring-loaded contacts approach presents a different set of problems relating to contamination of the contacts and the risk of electrical shock if the user comes into physical contact with the electrically active contact portion installed on the frame.

Alternative prior art systems have achieved both power and data transmissions between a door and a door frame. For instance, U.S. Pat. Nos. 8,294,302 and 9,290,966, both assigned to Hanchett Entry Systems, Inc. with the relevant disclosure of each incorporated herein by reference, disclose devices that avoid system limitations due to intervening and variable gaps between the door and frame by provision of spring loaded members, which place the opposing transmitter/receiver units within close proximity with one another to thereby enable efficient power transfer. However, these systems require at least the transmitter component or the receiver component to extend outwardly and beyond the plane of the door or door frame where it will be exposed and prone to damage or become disabled.

What is needed in the art is a robust and efficient system that provides wire-free power transfer between a door frame and a door, while avoiding the limitations in the prior art, discussed above.

What is further needed in the art is a compact system that will occupy a minimal amount of area in a door edge or door frame.

What is yet further needed in the art is a system wherein its circuitry optimizes the power output of the device.

It is a principal object of the present invention to provide a compact, wire-free power transmission system wherein the transmitter and receiver are seated flush within their respective door or door frame while simultaneously compensating for the distance of the gap between the door and corresponding door frame, regardless of the gap's unique characteristics (i.e. gap distance,)

SUMMARY OF THE INVENTION

What is presented is a power-transfer system that provides resonant inductive power from a first object to a second object, which is adjacent to the first object. The system includes a first transformer portion that is positioned on the first object and having a first core portion. The first core portion includes a transmit unit configured to transfer an electromagnetic field to the second transformer portion. The first core portion also includes first circuitry that allows the transmit unit to transfer the electromagnetic field. The second transformer portion is positioned on the second object and has a second core portion. The second core portion includes a receiver unit configured to receive the electromagnetic field. The second core portion also includes second circuitry that receives the electromagnetic field and converts it to DC voltage.

In certain embodiments of the system, the system comprises a timer/sensor, located in the first transformer portion that is configured to monitor the position of the second object. Moreover, the timer/sensor can be embodied as a reed switch that is influenced by a permanent magnet positioned on the second object. In certain instances, a timing circuit can be incorporated into the timer/sensor. This timing circuit is to limit the duration of time that power can be provided to a load. In certain instances, an auxiliary position sensor is used in conjunction with the timer/sensor. This auxiliary position sensor is configured to sense the specific position of the second object in comparison to the first object.

In certain embodiments of the system, the first circuitry comprises a voltage regulator, Royer oscillator, and rectifier. The voltage regulator is configured to control the voltage from a power source providing a fixed output independent of the input voltage over a certain range. The Royer oscillator is configured to transform the DC voltage output from the voltage regulator into two positive going half sine wave signals which are applied to two opposite terminals of an LC tank circuit. The rectifier converts the two sine wave signals back to a DC voltage which is sent to the feedback pin of the voltage regulator to control the voltage output from said Royer oscillator.

In certain embodiments of the system, the second circuitry comprises a rectifier and voltage regulator. The rectifier is configured to convert the AC voltage induced in the receiver unit back to DC voltage. The voltage regulator is configured to maintain a constant voltage level of the output from said rectifier. In certain instances, the second circuitry also comprises an output voltage selector that is configured to allow the voltage supplied to the load to be selected by a user.

Although not a requirement, the first object can be a door frame and the second object can be a door that is movably connected to the door frame. An open circuit can be created when said transmit unit is beyond the proximity limit of said receiver unit. The first transformer portion and second transformer portions can each have an external diameter of one inch or less.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
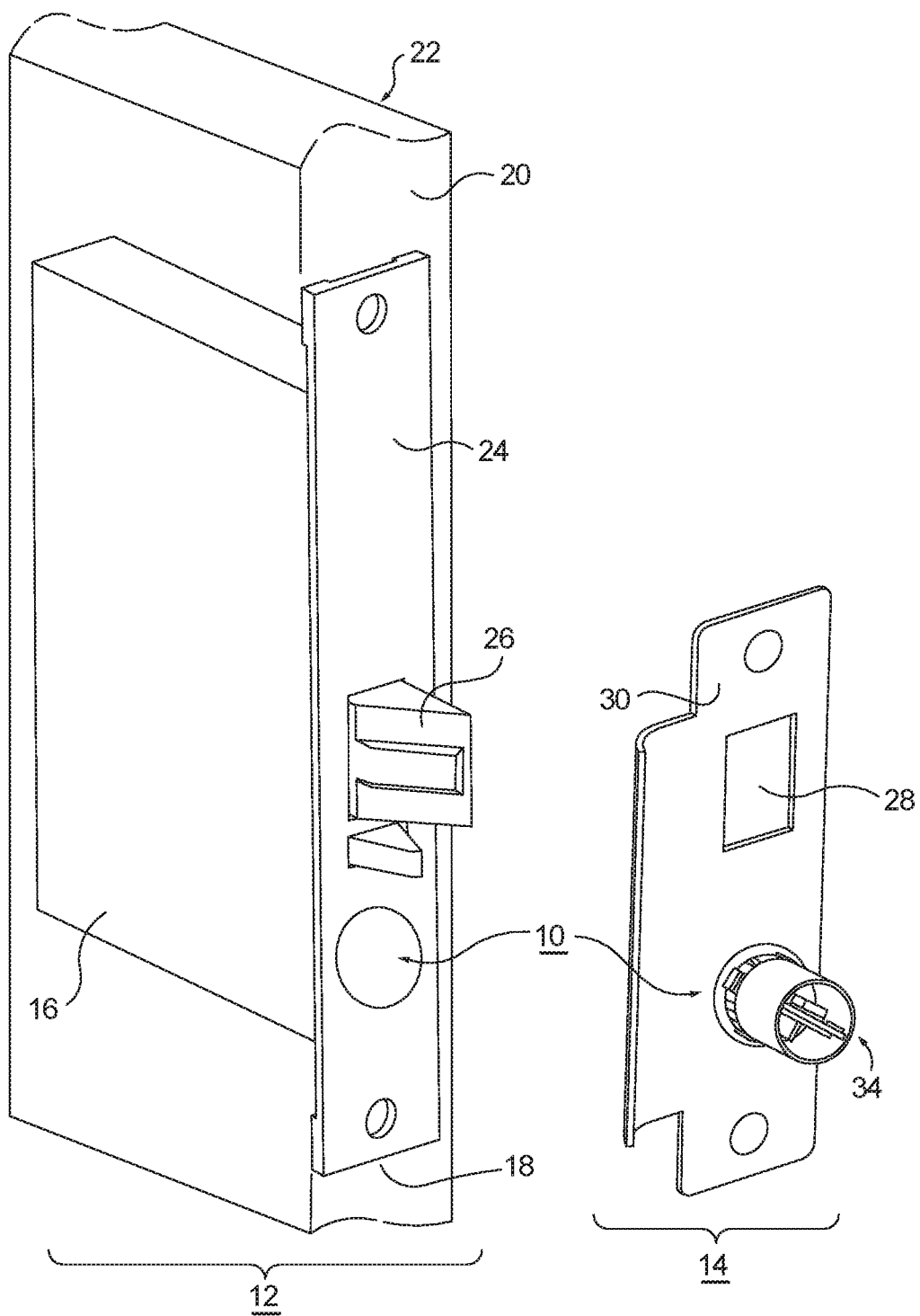
FIG. 1 a perspective view of the environment that an embodiment of the power transfer system is installed, in accordance with the present invention.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Figure 2:
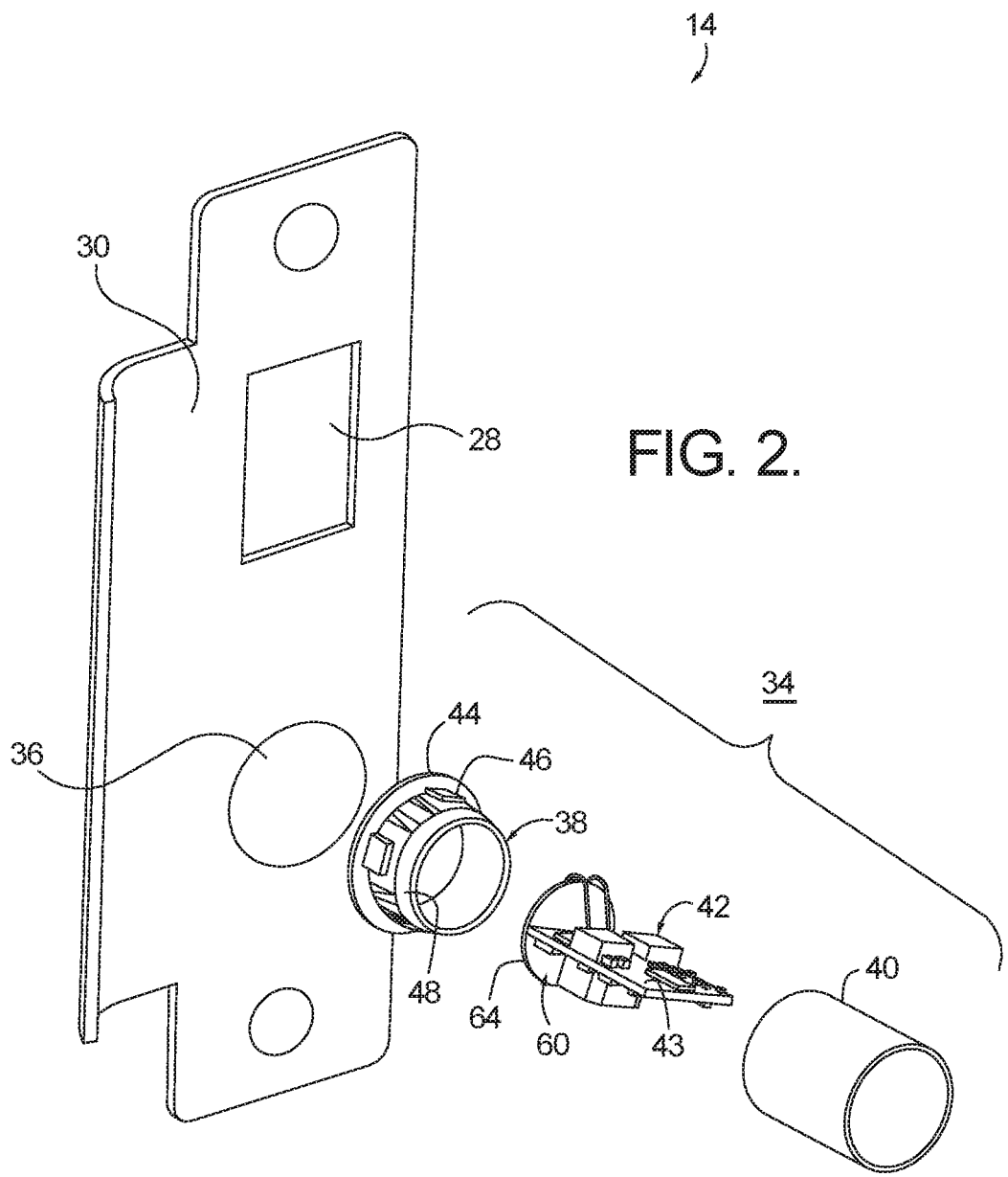
FIG. 2 is an exploded view of a strike plate and first transformer portion of the embodiment of FIG. 1.
Figure 3:
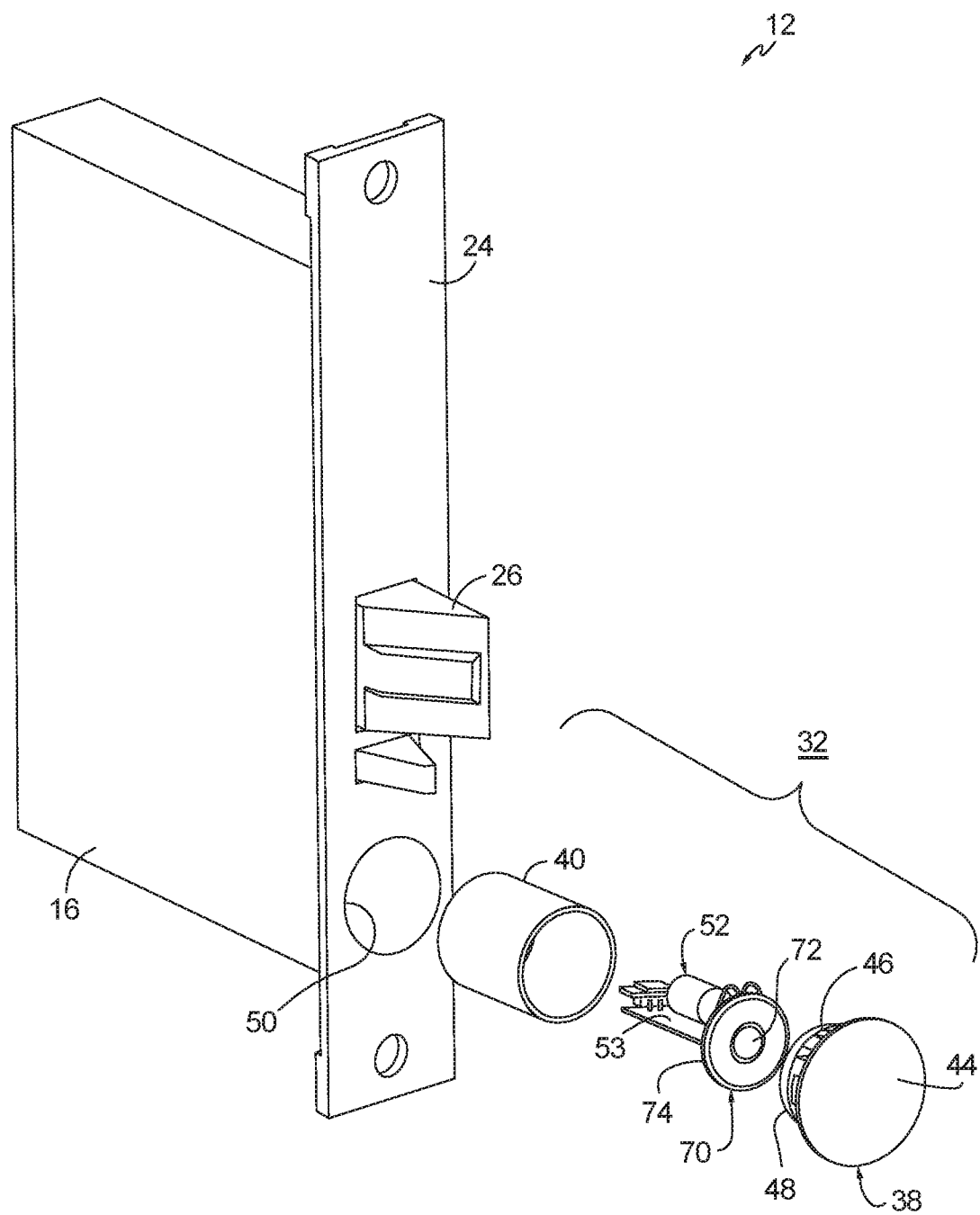
FIG. 3 is an exploded view of the lock body and second transformer portion of the embodiment of FIG. 1.

Referring to FIG. 1 through 4, an embodiment of a resonant inductive power coupling transfer system (hereinafter "power-transfer system") is generally indicated by reference numeral 10. Power-transfer system 10 includes a first transformer portion 34 (FIG. 2) and a second transformer portion 32 (FIG. 3). In this embodiment, the power-transfer system 10 is substantially contained in a mortise lock set having a door unit 12 and a frame unit 14. However, it is under stood that power-transfer system 10 need not be contained within a lock set.

Door unit 12 generally includes a first object that is a lock body 16 in this embodiment. The lock body 16 is inserted within a mortise cut 18 into the edge 20 of a door 22, proportioned so as to create a friction fit between the lock body 16 and door 22. A face plate 24 covers any gaps between the lock body 16 and the face of edge 20 as well as protects the internal mechanisms housed within the lock body 16. Face plate 24 is generally adapted to fit flush with the edge surface of the door 22, when properly secured. Lock body 16 is equipped with a latch 26, which passes through latch aperture 28 on a second object that is a strike plate 30 in this embodiment. The strike plate 30 engages within a recess (not shown) in the door frame so as to secure the door in a closed position. Latch 26 may be an electrified latch powered by power-transfer system 10.

The embodiment of the power-transfer system 10 shown in FIG. 1 resides in an area typically occupied by a dead bolt mechanism. An inductively coupled power-transfer unit (second transformer portion 32) replaces the dead bolt slide in the door. Similarly, a corresponding inductively coupled power-transfer unit (first transformer portion 34) is situated proximate the opening typically reserved in strike face plate 14 for passage of the deadbolt slide when the deadbolt is engaged. The first transformer portion 34 is configured to operate as a transmitter while the second transformer portion 32 is configured to operate as the corresponding receiver. As follows, it is envisioned that properly mounted mortise locks (currently mounted within structures such as, but not limited to, homes and businesses) may be retrofitted with the present embodiment of the power-transfer system 10, as shown in FIG. 1, with no or minimal need of any additional physical modifications to the door, frame, or other corresponding components. Alternatively, door 22 and the door frame may be adapted to include opposing recesses respective to the first transformer portion 34 and second transformer portion 32. In one aspect of this embodiment, the door and door frame recesses have diameters less than or equal to one inch to accommodate the first and second transformer portions.

Referring now to FIG. 2, frame unit 14 includes strike plate 30 for receiving first transformer portion 34. Strike plate 30 includes apertures 28 and 36 formed therein. Aperture 28 is sized to accept insertion of a latch 26 (see FIGS. 1 and 3) when strike plate 30 is properly positioned and secured on a door frame. In this embodiment, aperture 36 is configured to receive first transformer portion 34, which is generally comprised of a cap member 38 and a housing member 40. Housing member 40 may be generally cylindrical. Positioned within housing member 40 is a first core portion 42, discussed in more detail below with regard to FIG. 4.

Cap member 38 includes a top-cover portion 44, which is proportioned to be slightly larger than the diameter of aperture 36 such that cap member 38 rests against the door-facing surface of strike plate 30 when properly mounted. Alternatively, it should be understood that strike plate 30 may include a stepped portion (not shown) configured to receive top-cover portion 44 such that the top-cover portion 44 sits flush with the door-facing surface of the strike plate 30. Cap member 38 further includes a sidewall having a first sidewall portion 46 and a second sidewall portion 48, each configured to extend through strike plate 30 and into a recess formed in the door frame (not shown). In this embodiment, as stated above, the recess formed in the door frame has a maximum diameter of one inch (1"). First sidewall portion 46 is proportioned to be equal to or slightly larger than the diameter of the door frame recess. In this manner, the first sidewall portion 46 will engage the door frame through a friction fit. First sidewall portion 46 may also include ramp features and/or fin features that increase frictional forces between cap member 38 and the frame recess, as well as reduce the possibility of unwanted withdrawal of first transformer portion 34 from the door frame and strike plate 30. Second sidewall portion 48 is proportioned to frictionally receive housing member 40 as housing member 40 slides over second sidewall portion 48. While the above fastening means have been described as friction fits, alternative fasteners may be used, such as threaded connections between strike plate 30 and first sidewall portion 46 or between second sidewall portion 48 and housing member 40, or by using additional threaded fasteners such as, but not limited to, screws, bolts, or set screws, or by using a suitable adhesive.

FIG. 3 provides an exploded view of second transformer portion 32 of power-transfer system 10 in relation to door unit 12. Similar to the first transformer portion 34, discussed above, second transformer portion 32 generally includes a cap member 38 and a housing member 40. Housing member 40 may be generally cylindrical. Positioned within housing member 40 of second transformer portion 32 is a second core portion 52. Second transformer portion 32 is configured to reside within a recess (not shown) in lock body 16 by passing through aperture 50, defined within face plate 24. Top cover portion 44 rests along the strike plate-facing surface of face plate 24, and may reside within a stepped groove so as to sit flush with the face plate. First sidewall 46 engages the recess and/or side surface of aperture 50 so as to secure second transformer portion 32 within lock body 16. As described above, second sidewall portion 48 is proportioned to receive housing member 40 as housing member 40 slides over second sidewall portion 48 and is connected to the second sidewall portion 48 through friction fitting. While the above fastening means have been described as friction fitting, alternative fasteners may be used, such as threaded connections between lock body recess and/or face plate 24 and first sidewall portion 46 or between second sidewall portion 48 and housing member 40, or by using additional threaded fasteners, such as, but not limited to, screws, bolts, or set screws, or by using a suitable adhesive.

With reference to both FIGS. 2 and 3, each of the core portions 42 and 52 may generally be comprised of a core half, such as, but not limited to, pot core halves 60 (FIG. 2) and 70 (FIG. 3), respectively, having a cylindrical post 72 and a magnetic bobbin (64 and 74, respectively) wound with electrically conductive coils. Electrical current is supplied to the set of coils wrapped around bobbin 64 to generate an alternating current (AC) electromagnetic field. The electromagnetic field emanates directly from the coils on bobbin 64, causing the coils to function together as a transformer. In this embodiment, the coils have an approximately 0.75 inch diameter. The components of the core portions 42 and 52 are installed onto printed circuit boards (PCBs) 43 and 53, respectively, or the equivalent, having an approximately 0.90 inch width and an approximately 1.5 inch length, to allow for easy installation into the respective housing member 40. If, and when, second core portion 52 is properly within the electromagnetic field generated by the first core portion 42, an induced AC current is generated by the coils wound around bobbin 74, discussed below. This induced electrical current may then be transferred to any desired load, which is typically an electronic device, such as, but not limited to, an electric lock or electric key pad.

In accordance with an aspect of the present invention, the package density for the transformer portions 32, 34 (and associated core portions 42,52) is required to comply with the established NFPA standard to allow for the door to be endorsed with a fire label. In this embodiment, the housing member 40 for each core portion 42 and 52 has an external diameter of one inch (1") or less, as current fire codes for fire door applications restrict any recesses formed in the door to be one inch or less. A pot core such as Part #22-13-00, available from TSC Ferrite International, Wadsworth, Ill., meets the necessary specifications to support the configuration of this embodiment of the present invention. However, one having ordinary skill in the art will see that other equivalent pot cores or air coils and components may meet the necessary specifications of this embodiment.

As described above with regard to FIG. 1, each of the core portions 42 and 52 are fixedly mounted to a respective door frame or door, with the intervening gap between the core portions 42 and 52. In essence, when the first core portion 42 is mounted to the door frame, the corresponding second core portion 52 is mounted to the corresponding door. The gap between the core portions 42 and 52 may align with the distance between the edge of the door and corresponding door frame. It should be understood that while the gap is fixed and defined by the distance between a particular door and its particular frame, the gap distance is unique to each installation and may vary from one door/door frame unit to the next. It should also be understood that this embodiment is not necessarily required to be installed within a door and door frame of a traditional structure. One having ordinary skill will see that this embodiment of the power-transfer system 10 may also be installed in other environments such as, but not limited to, the door and door frame of an automobile or a secured lock box as well as the matching gate doors of a gate entryway.

Figure 4:
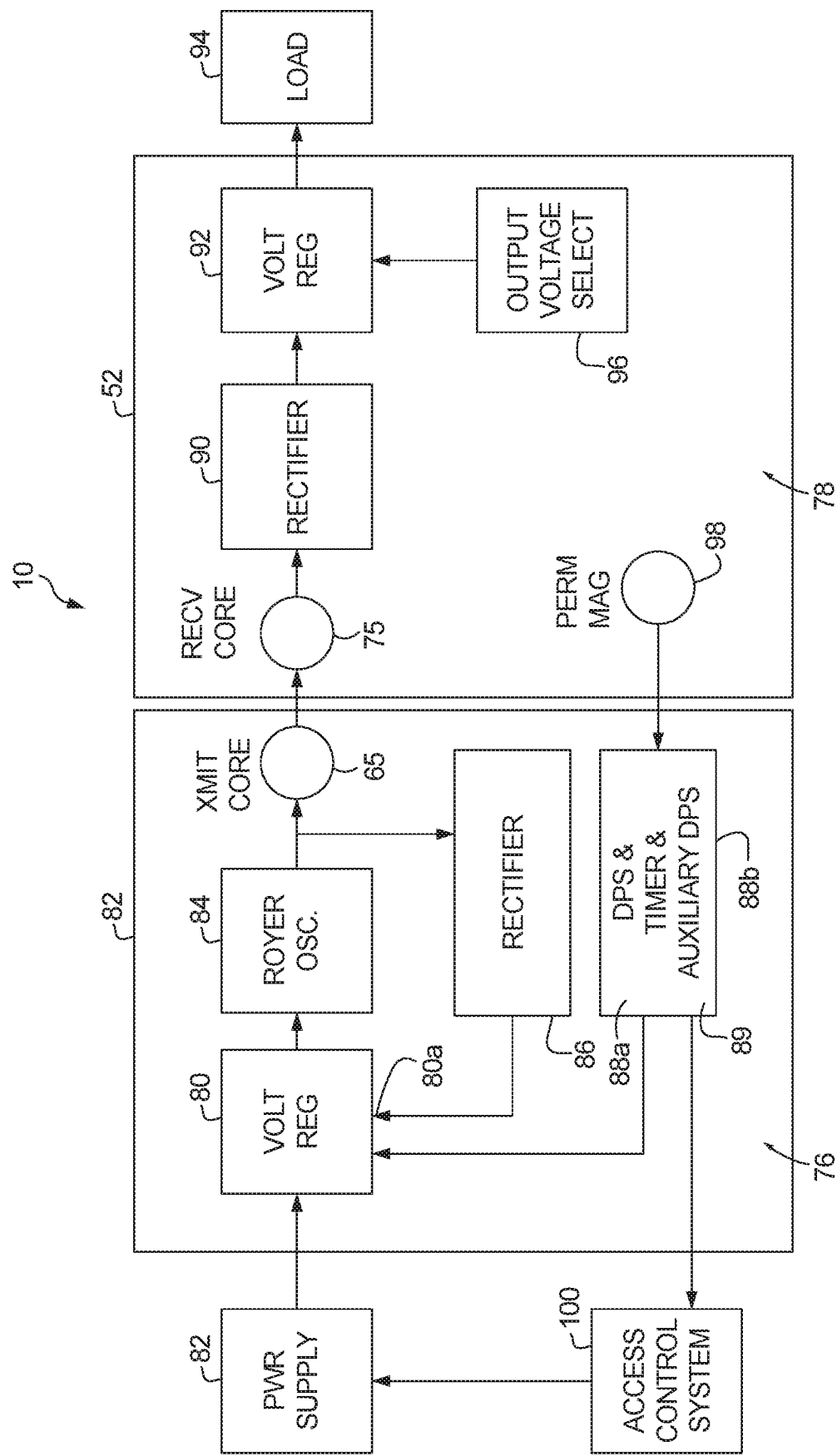
FIG. 4 is a block diagram of an embodiment of the power transfer system.

With reference to FIG. 4, in this embodiment, core portions 42 and 52 include respective circuitry 76 and 78 designed to compensate for unique characteristics of the distance of the gap between a particular door and its particular door frame. For instance, core portions 42 and 52 can properly transfer an electromagnetic field across the distance of a gap when it is several millimeters in length. The core portions 42 and 52 can also properly transfer the electromagnetic field through non-magnetic/non-conductive materials situated directly between the respective door and door frame.

The first core portion 42 comprises first circuitry that is configured to allow it to operate as a transmitter of the electromagnetic field. The first core portion 42 may include a voltage regulator 80 to receive DC voltage from a power supply 82. The voltage regulator 80 controls this DC voltage at its output and causes the voltage to become constant. The constant voltage is then provided to a Royer oscillator 84, which then transforms this constant voltage from DC to AC at the output. In certain instances, the Royer oscillator 84 will convert the constant voltage to an AC voltage having a sinusoidal waveform. A rectifier 86 is connected to the output of the Royer oscillator 82 and conditions the output to a lightly-filtered DC voltage. Positioning a rectifier 86 within the first circuitry at this location allows the output voltage from the Royer oscillator 84 to become fixed in spite of the variable inductance that is seen across the Royer oscillator 84 as the first core unit and second core unit are moved apart. The DC voltage conditioned by the rectifier 86 is then applied to the feedback input 80*a* of the voltage regulator 80. Voltage regulator 80 may further operate using a single-ended primary-inductor converter (SEPIC) topology, to vary the voltage at the output of the voltage regulator 80 (i.e. to control the output voltage of the voltage regulator 80). The output voltage of the voltage regulator is typically set to be the value required for the second core output voltage of 12 volts pick and 6 volts hold. "Pick" voltage is the voltage needed to draw an armature toward an associated electromagnet/solenoid and "hold" voltage is the voltage needed to hold the armature within the magnetic field of the associated electromagnet/solenoid.

In this manner, the AC voltage outputted from Royer oscillator 84 remains constant as it is applied to the transmit unit 65 containing first core portion 42, which is typically a tightly wound coil wrapped around the bobbin 64 of first core portion 42. The equation representing the inductance as seen at the input of transmit unit 65 is as follows:

$$L_{transmit\ effect} = K\sqrt{L_{transmit} \times L_{receive}}$$

Where $L_{transmit\ effect}$ is the effective inductance and the constant K represents the coupling of the two coils as determined by the gap distance between the transmit unit 65 and a receiver unit 75 containing second core portion 52, which is typically a tightly wound coil wrapped about the bobbin 74 of second core portion 52

By maintaining a constant voltage into the transmit unit 65, a constant and oscillating electromagnetic field is in turn generated by the highly-resonant transmit unit 65. This electromagnetic field is then transmitted from the transmit unit 65 beyond the distance of the gap, where it is subsequently received by the receiver unit 75. The receiver unit 75 is able to substantially receive at least a portion, and preferably substantially all, of the electromagnetic field being transmitted over the gap, regardless of the distance. The constant electromagnetic field then induces a constant AC current in the receiver unit 75, as described above. This communication completes the near-field wireless transmission of the electromagnetic field between the transmit unit 65 and receiver unit 75. The current induced in the receiver unit 75 also typically oscillates at the same general frequency as the current of the electromagnetic field transferred across the gap by the transmit unit 65. With the transmit unit 65 and receiver unit 75 resonating at a common frequency, significant power may be transmitted between these coils with reasonable efficiency. This in effect also ensures that the receiver unit 75 optimally absorbs the energy from the electromagnetic field. The transmit unit 65 and receiver unit 75 may also each be a single layer coil. It should be understood that components can be modified in the second circuitry to off-tune the secondary circuit with respect to the frequency of the electromagnetic field generated from the transmit unit 65. This technique enables a fairly constant voltage out of the second circuitry in spite of the separation variability between the door and the jamb.

The second core portion 52 comprises second circuitry that is configured to allow it to operate as a receiver. After the electromagnetic field is received by the receiver unit 75, the induced current may then be rectified by a rectifier 90 that is directly in series with the receiver unit 75, to convert the AC voltage back to DC voltage. A voltage regulator 92 may then be positioned in series with the rectifier 90, to maintain a constant output voltage level. This regulated DC voltage may then power a load 94 (located outside of the circuit), which may be an electromagnetic actuator within door unit 12. In certain instances, an output voltage selector 96 is included within second core portion 52. The output voltage selector 96 causes the voltage supplied to the load (e.g., 12 V DC or 24 V DC) to be selected by a user, either in the environment in which the power-transfer system 10 is installed or remotely through some means of communication (e.g. via the internet), depending upon the particular system requirements.

When the door is in the closed position within the door frame, such that the transmit unit 65 is in proximity with the receiver unit 75 and the electromagnetic field can be properly transferred to the receiver unit 75, the electric circuit of the power-transfer system 10 is complete. Thus, when a single pulse of power is emitted from an access control processor 100 (such as through a key pad, card reader, fob reader, or the like) to power supply 82, the power supply 82 is activated to provide the actuator (load 94) with maximum power for a short fixed interval via the induced current received by the receiver unit 75, so as to unlock the latch and enable its withdrawal from an aperture in the strike plate. This, in effect, ultimately allows the door to be opened. During pick time (the duration of time that full power is applied to the load 94) both voltage out and current out levels are increased through the voltage regulator 80. During hold time (the duration of time that the power to load 94 has been stepped down so as to hold the latch in the powered state), both output voltage and current are limited to protect Royer oscillator 84 from overheating, thus, reducing the risk of user exposure to unsafe temperatures and protecting the electronic components and associated circuitry on both frame and door sides. It should be noted when the transmit unit 65 is not in proximity with the receiver unit 75 (i.e. typically when the door is in the open position), an open circuit is created and voltage is lost in the second transformer portion 32. When this occurs, power cannot transfer from the transmit unit 65 to the receiver unit 75. Thus, activating the power supply 82 would not provide power to the load 94. The open circuit is typically created when the distance between the transfer unit and the receiver unit 75 is over 0.5 inches.

In certain instances, a sensor unit 88*a* may be implemented to monitor the door position. For example, the sensor unit 88*a* may be a reed switch that is influenced by the magnetic field created by a permanent magnet 98 installed on the second core portion 52 that is positioned on the door 22. When the magnetic field created by the permanent magnet is out of the range of the sensor unit 88*a*, the sensor unit 88 maintains that the power supply remains off and without power. Thus, by using the system of a reed switch and associated permanent magnet, the transmitter remains unpowered while the door is in the open position. In certain instances, an auxiliary position sensor 88*b* may also be employed to ensure proper monitoring of the door position. It should be understood that, functionally, the sensor unit 88*a* as well as the auxiliary position sensor 88*b* may incorporate any suitable sensor system capable of sensing when the door is closed and not closed, such as, but not limited to, a photo sensor, a pressure sensor, a micro switch, a passive infrared sensor, a radio frequency (RF) sensor, a second reed switch, or the like. A timing circuit 89 may also be implemented. The timing circuit may be employed to limit the duration of time that power can be provided to the load 94. For instance, the timing circuit may be initiated by either the powering up of power supply 82 or by the door returning to the closed position, as discussed above with regard to FIG. 1. It should be understood that the timing circuit 89 may incorporate any suitable timing system capable of limiting the duration of time that full power can be provided to the load 94 (such as, but not limited to, a 555 timer IC chip).

It should be understood that the power transfer system 10 is not necessarily required to be installed in a door and corresponding door frame or mullion discussed in detail for the above disclosed embodiment. In certain applications, an embodiment of the power-transfer system 10 may be used to charge the batteries of portable devices (such as, but not limited to, cellular phones and tablet computers) at a distance and without the portable device being tethered to a power outlet. In other applications, an embodiment of the power-transfer system 10 may be used to provide electric power in medical implantable devices and/or hypo-dermal medical devices. In other instances, an embodiment of the power-transfer system 10 may be used to provide an electrical connection through the rotating joints of the armatures of mounted medical arm devices, robotics, and the like. In other instances, an embodiment of the power-transfer system 10 may be used for recharging electric automobiles that are parked in certain parking spots and parking garages that are equipped with a core portion having a transmit unit. In each of these a skilled artisan will see how each application of the power-transfer system 10 can be properly installed into its respective environment to sufficiently meet the needs of the power-transfer system's 10 application.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the following claims.

What is claimed is:

1. A system comprising:
   a power-transfer system for providing resonant inductive power from a door frame to a door,
   wherein said door frame and said door are adjacent with respect to each other at a resulting distance when said door is closed in said door frame, wherein a regulated DC voltage applied to a load provided by said power-transfer system from said door frame to said door is constant regardless of said resulting distance when said door is closed in said door frame, wherein said power-transfer system comprising comprises:
   a) a first transformer portion positioned on said door frame and having a first core portion, said first core portion comprising:
      i) a transmit unit configured to generate and transfer a constant AC electromagnetic field; and
      ii) a first circuitry comprising:
         1) a voltage regulator configured to receive a source DC voltage from a power supply and to stabilize said source DC voltage to a constant output DC voltage, wherein said voltage regulator includes a feedback input;
         2) a Royer oscillator configured to receive said constant output DC voltage from said voltage regulator and to convert said constant output DC voltage to an AC voltage; and
         3) a rectifier configured to receive said AC voltage from said Royer oscillator and to provide a conditioned DC feedback voltage to said feedback input of said voltage regulator, wherein a constant output AC voltage is provided from said Royer oscillator to said transmit unit so that said transmit unit generates and transmits said constant AC electromagnetic field;
   b) a second transformer portion positioned on said door and having a second core portion, said second core portion comprising:
      i) a receiver unit configured to receive said constant AC electromagnetic field to provide a constant induced AC current; and
      ii) a second circuitry configured to use said constant induced AC current from said receiver unit to apply a regulated DC voltage to a load, and
   wherein said constant AC electromagnetic field is transferred regardless of said resulting distance when said door is closed in said door frame.

2. A system in accordance with claim 1 further comprising a sensor configured to monitor the position of said door.

3. A system in accordance with claim 2 further comprising a timing circuit configured for limiting the duration of time that full regulated DC voltage can be provided to said load.

4. A system in accordance with claim 1 further comprising:
   a sensor configured to monitor the position of said door; and
   an auxiliary position sensor configured to sense the specific position of said door in comparison to said door frame.

5. A system in accordance with claim 2 wherein said sensor is a reed switch influenced by a permanent magnet positioned on said door.

6. A system in accordance with claim 1 wherein said voltage regulator is configured to operate using SEPIC topology.

7. A system in accordance with claim 1 wherein said second circuitry comprises:
   a) a rectifier configured to convert the AC voltage induced in said receiver unit said constant induced AC current to said regulated DC voltage; and
   b) a voltage regulator in series with said rectifier of said second circuitry, wherein said voltage regulator is configured to maintain a constant voltage level of output said regulated DC voltage from said rectifier.

8. A system in accordance with claim 7 wherein said second circuitry further comprises an output voltage selector configured to allow the said regulated DC voltage supplied to said load to be selected by a user.

9. A system in accordance with claim 7 wherein said second circuitry is off-tuned with respect to a frequency of said constant AC electromagnetic field transferred by said transmit unit.

* * * * *